United States Patent [19]

Oda et al.

[11] 3,925,464

[45] Dec. 9, 1975

[54] PROCESS FOR PREPARING UNSATURATED CARBOXYLIC ACIDS FROM THE CORRESPONDING UNSATURATED ALDEHYDES

[75] Inventors: Yoshio Oda; Keiichi Uchida, both of Yokohama; Manabu Suhara, Tokyo; Takeshi Morimoto, Yokohama, all of Japan

[73] Assignee: Asahi Glass Co., Ltd, Tokyo, Japan

[22] Filed: Dec. 12, 1972

[21] Appl. No.: 314,397

[30] Foreign Application Priority Data
Dec. 14, 1971 Japan.............. 46-100718
Feb. 25, 1972 Japan............... 47-18877

[52] U.S. Cl............................. 260/530 N; 252/437
[51] Int. Cl.²........................................ C07C 51/26
[58] Field of Search............................... 260/530 N

[56] References Cited
UNITED STATES PATENTS
3,686,294   8/1972   Ito et al. ................... 260/530 N FOREIGN PATENTS OR APPLICATIONS
903,034      8/1962   United Kingdom............ 260/530 N
1,185,109    3/1970   United Kingdom............ 260/530 N
41-6262      4/1966   Japan............................. 260/530 N
42-5221      3/1967   Japan............................. 260/530 N
999,836      7/1965   United Kingdom............ 260/530 N Primary Examiner—James A. Patten
Assistant Examiner—Richard D. Kelly
Attorney, Agent, or Firm—Oblon, Fisher, Spivak, McClelland & Maier

[57]   ABSTRACT

A process for preparing unsaturated carboxylic acids which comprises reacting the corresponding unsaturated aldehydes with molecular oxygen in the presence of a catalyst consisting essentially of (a) molybdenum, (b) phosphorous, (c) at least one element selected from the group consisting of tungsten and magnesium, (d) at least one element selected from the group consisting of vanadium and bismuth, and (e) oxygen.

16 Claims, No Drawings

PROCESS FOR PREPARING UNSATURATED CARBOXYLIC ACIDS FROM THE CORRESPONDING UNSATURATED ALDEHYDES

BACKGROUND OF THE INVENTION

1. Field Of The Invention

This invention relates to a process for preparing unsaturated carboxylic acids having from three to four carbon atoms by the catalytic vapor phase oxidation of the corresponding unsaturated aldehydes. More particularly, the inventin relates to a process for preparing methacrylic acid from methacrolein, characterized mainly by the use of novel catalysts.

2. Description Of The Prior Art

Conventionally, many catalysts useful for the preparation of unsaturated carboxylic acids having from three to four carbon atoms by the catalytic vapor phase oxidation of the corresponding unsaturated aldehydes with molecular oxygen have already been proposed. Some of those are excellent for preparing acrylic acid from acrolein and have been used for the production of acrylic acid on a large scale. Various catalysts for preparing methacrylic acid from methacrolein have also been proposed. However, methacrylic acid has not been produced from methacrolein by the use of these catalysts commercially because of the low yield. This is because methacrolein is more combustible than acrolein, i.e., it is subjected to complete oxidation to carbon monoxide and/or carbon dioxide rather than to partial oxidation to the desired product, and because methacrolein is easily polymerizable to heavy compounds. Presently, an excellent catalyst for the preparation of methacrylic acid has not yet been found. As examples of the catalysts of the prior art, U.S. Pat. Nos. 3,358,020 and 3,435,069 disclose catalysts which show excellent results for the production of acrylic acid (the conversion of acrolein is 96 – 100%, while the selectivity to acrylic acid is 80 – 90%), but not for the production of methacrylic acid (the conversion of methacrolein is 29 – 63%, while the selectivity to methacrylic acid is 11 – 41%).

A need exists, therefore, for a catalyst which minimizes or eliminates the oxidative side reactions and the polymerization reactions which occur in the conversion of acrolein and methacrolein to their respective acid derivatives.

SUMMARY OF THE INVENTION

Accordingly, it is an object of this invention to provide a method for preparing methacrylic acid and acrylic acid from their aldehyde precursors in yields which are superior to those attained from prior art processes.

Another object of this invention is to provide a novel catalyst for the preparation of unsaturated carboxylic acids from the corresponding unsaturated aldehydes and a method for the preparation thereof.

Briefly, these objects and other objects of the present invention, as hereinafter will become apparent, are achieved by a process for preparing unsaturated carboxylic acids by the oxidation of the corresponding unsaturated aldehydes with molecular oxygen in the vapor phase at a temperature of from 250° to 450°C., in the presence of a catalyst consisting of (a) molybdenum, (b) phosphorus, (c) at least one element selected from the group consisting of tungsten and magnesium, (d) at least one element selected from the group consisting of vanadium and bismuth, and (e) oxygen.

According to the process of the invention, typical values obtained for the conversion and selectivity of methacrolein to methacrylic acid range from 60 – 70% and 75 – 83%, respectively. For the oxidation of acrolein to acrylic acid, the conversion and selectivity values range from 95 – 100% and 80 – 85%, respectively.

Catalysts are capable of having the desired catalytic activity, only when the catalysts contain all of the essential components. If the catalysts lack one or two of the essential components, the activity of these catalysts is very low which results in small amounts of the desired unsaturated carboxylic acids. Thus, these catalysts are unsatisfactory for commercial applications.

If the catalysts of this invention contain all the essential components, they have a very good catalytic activity. The preferred catalysts of the invention are characterized by an empirical formula which in part contains 12 molybdenum atoms as follows:

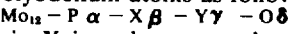

$$Mo_{12} - P\alpha - X\beta - Y\gamma - O\delta$$

wherein X is at least one element selected from the group consisting of W and Mg; Y is at least one element selected from the group consisting of V and Bi; $\alpha$ is a number from 0.1 to 5, preferably 0.2 to 3; $\beta$ is a number from 0.1 to 10, preferably 0.3 to 5; $\gamma$ is a number from 0.1 to 10, preferably 0.3 to 5; $\delta$ is decided on the basis of the oxidation states of Mo and P and the X and Y elements, and $\delta$ is 37 to 131 when each component is in a highly oxidized state.

The catalysts of this invention may contain additional elements such as tantalum, tin, titanium or the like unless they impair the activity of the catalyst.

The catalysts of this invention may be prepared by any one of several methods. Preferably, the catalysts may be prepared by concentrating a solution or a suspension containing the desired components and drying the resulting concentrate. Thereafter, preferably the dried product is calcined at a temperature of from 250° to 450°C., for about 1 to about 48 hours in air. Then, the calcined product is ground into a mesh size of 5 to 100, which is suitable for use. The prepared catalyst has a specific surface area of 0.1 to 50 m²/g.

In some cases, in order to improve the physical properties of the catalysts, the catalysts are preferably supported on a suitable carrier, such as silica, silica-containing materials, silicon carbide, alumina and the like. The amount of the carrier used is prferably in the range of 30 to 97% by weight based on the supported catalyst.

The exact chemical structure of the catalysts of this invention is not known. However, it can reasonably be presumed that the catalyst may be a homogeneous mixture of the oxides of all the components, or it may be a compound or a complex formed by means of the mutual reaction of the salts of molybdenum and phosphorus and the oxides of the other components.

The starting materials of each component used in the preparation of the catalysts are listed as follows: Suitable sources of molybdenum include, ortho-, meta- or paramolybdic acid, ortho, meta- or paramolybdates, heteromolybdic acid, heteromolybdates, molybdenum oxide and the like. Preferably ammonium paramolybdate is used. Suitable sources of phosphorus include phosphoric acid, phosphates, polyphosphoric acid, polyphosphates and the like. Phosphomolybdic acid or phosphomolybdates may effectively be used as a common starting material for both the molybdenum and the phosphorus components. Suitable sources of tungsten include tungsten trioxide, tungstic acid, ammonium tungstates and the like. Suitable sources of bismuth include bismuth nitrate, bismuth oxide and the like. Suitable sources of magnesium include magnesium nitrate, magnesium chloride, magnesium oxide and the like. Suitable sources of vanadium include vanadium pentoxide, ammonium vanadate and the like.

The essential reactants of this invention include the unsaturated aldehydes, acrolein and methacrolein and molecular oxygen which may be administered as pure oxygen, oxygen diluted with inert gases, oxgyen enriched air or air without additional oxygen. In view of economy, air is the most practical source of molecular oxygen.

The reaction of this invention may be conducted in either a fixed or fluidized catalyst bed. The reaction temperature may vary within the range from 250° to 450°C., preferably from 300° to 400°C. The reaction pressure may vary within the range of from 0.5 to 40 atmospheres absolute, preferably from about 1 to 10 atmospheres absolute. When the reaction pressure is relatively high within the indicated range, the reaction temperature may be somewhat lower within the indicated range.

Contact time usually varies from 0.2 to 30 seconds, preferably from 1 to 20 seconds.

The molar ratio of oxygen to unsaturated aldehydes in the feed gas usually varies from 1 : 10 to 10 : 1, preferably from 1 : 3 to 3 : 1.

Steam may be added to the gaseous reactant mixture, which improves the yield of unsaturated carboxylic acids. Further, nitrogen, saturated hydrocarbons such as methane, propane, butane or the like, or other inert gases may be also added to the gaseous reactant mixture. The concentration of the steam may vary within the range from 2 to 80%, preferably from 10 to 50% of the volume of the feed.

Since the reaction of this invention is exothermic, the temperature within the reactor must be regulated in order to control the reaction. Thus, the reactor is preferably placed in a fluidized solid bath, a molten salt bath or a metal bath.

The methacrylic acid or acrylic acid may be recovered from the reaction products by any one of the conventional methods. Suitable separative techniques include condensation and/or extraction followed by distillation.

The following definitions apply to the conversion of unsaturated aldehydes, and the selectivity and the yield of unsaturated carboxylic acids. All the analyses were conducted by means of gas chromatography.

Having generally described the invention, a further understanding can be obtained by reference to certain specific Examples which are provided herein for purposes of illustration only and are not intended to be limiting unless otherwise specified.

In the following Examples, the reaction was conducted in a U-shaped stainless steel reactor 400 mm. long with an inner diameter of 6 mm. The reactor was filled with 4 ml. of a catalyst which was formed by a procedure described in each of the following Examples, and was placed into a molten salt bath ($KNO_3/NaNO_3$ =0 1/1) heated to the reaction temperature. The gaseous reactant mixture was fed into the reactor and the effluent from the reactor was passed into a condenser cooled with dry-ice ethanol bath. The uncondensed gas and the condensate were analyzed individually by means of gas chromatography.

EXAMPLE 1

A 23.1 gram quantity of 85% orthophosphoric acid dissolved in 50 ml. of water was added with stirring to a liquid which contained 424 grams of ammonium paramolybdate ($(NH_4)_6Mo_7O_{24}\cdot 4H_2O$) dissolved in 500 ml. of water. A 100 ml. amount of nitric acid (14N), 52.2 grams of ammonium tungstate (5 $(NH_4)_2O\cdot 12WO_3\cdot 5H_2O$) suspended in 100 ml. of an aqueous nitric acid solution (7N) and 23.6 grams of vanadium pentoxide ($V_2O_5$) suspended in 100 ml. of an aqueous nitric acid solution (7N) were added to the liquid mixture. The resulting liquid was concentrated by heating with stirring, and the slurry obtained was dried at 120°C. for 16 hours. Thereafter, the dried product was calcined at 400°C. for 12 hours to yield a solid having the following empirical formula:

$$Mo_{18}P_1 W_1V_1O_{44.0}$$

The solid was passed through a sieve to yield catalyst particles with mesh sizes in the range of 35 to 100. An empty U-shaped reactor was filled with 4 ml. of the catalyst. The reactor was placed into a molten salt bath heated at 340°C. A gaseous reactant mixture composed of 5% methacrolein, 9% oxygen, 32% steam and 54% nitrogen, (percent by volume) was passed through the reactor with a contact time of 2 seconds. The following results were obtained:

| | |
|---|---|
| Conversion of methacrolein: | 88.9% |
| Selectivity to methacrylic acid: | 71.1% |
| Selectivity to acetic acid: | 11.0% |

The selectivity of acetic acid is defined as follows:

$$\text{Conversion (percent)} = \frac{\text{Unsaturated aldehyde in the feed (mole)} - \text{Unsaturated aldehyde in the effluent (mole)}}{\text{Unsaturated aldehyde in the feed (mole)}} \times 100$$

Selectivity (percent)

$$= \frac{\text{Unsaturated carboxylic acid in the effluent (mole)}}{\text{Unsaturated aldehyde in the feed (mole)} - \text{Unsaturated aldehyde in the effluent (mole)}} \times 100$$

$$\text{Selectivity of acetic acid (percent)} = \frac{\text{Acetic acid in the effluent (mole)}}{\text{Unsaturated aldehyde in the feed (mole)} - \text{Unsaturated aldehyde in the effluent (mole)}} \times 100 \times \frac{2}{3}$$

Yield (percent) = Conversion × Selectivity × 1/100

EXAMPLES 2 – 9

Catalysts were prepared in a manner similar to that of Example 1, except that the amounts of the starting materials were adjusted so as to give the atomic ratio values shown in Table I. The catalysts were used for the oxidation of methacrolein under substantially the same conditions as those employed in Example 1. The results obtained are shown in Table I.

TABLE I

| Example No. | Catalysts | Methacrolein conversion (%) | Methacrylic acid selectivity (%) | Acetic acid selectivity (%) |
|---|---|---|---|---|
| 2 | $Mo_{12}P_1W_3V_1O_{50.0}$ | 85.1 | 59.1 | 8.4 |
| 3 | $Mo_{12}P_1W_1V_3O_{49.0}$ | 81.2 | 63.7 | 9.5 |
| 4 | $Mo_{12}P_3W_1V_1O_{45.0}$ | 57.8 | 69.3 | 7.9 |
| 5 | $Mo_{12}P_1W_9V_1O_{88.0}$ | 55.4 | 35.3 | 5.7 |
| 6 | $Mo_{12}P_1W_1V_9O_{64.0}$ | 45.2 | 41.2 | 8.7 |
| 7 | $Mo_{12}P_5W_1V_1O_{54.0}$ | 25.4 | 53.4 | 8.9 |
| 8 | $Mo_{12}P_1W_2V_2O_{49.5}$ | 91.7 | 65.2 | 9.9 |
| 9 | $Mo_{12}P_1W_{0.5}V_{0.5}O_{41.3}$ | 83.3 | 66.5 | 6.2 |

EXAMPLE 10

A 23.1 gram quantity of 85% orthophosphoric acid dissolved in 50 ml. of water was added with stirring to a solution containing 423 grams of ammonium parmolybdate dissolved in 700 ml. of water. A 97.0 gram amount of bismuth nitrate $(Bi(NO_3)_3.5H_2O)$ dissolved in 300 ml. of an aqueous nitric acid solution (7N) was added all at once to the liquid mixture with stirring in addition to 52.2 grams of ammonium paratungstate $(5(NH_4)_2O. 12WO_3.5H_2O)$ suspended in 200 ml. of an aqueous nitric acid solution (7N). The resulting liquid mixture was concentrated by heating with stirring and the slurry obtained was dried at 120°C. for 16 hours. Thereafter, the dried product was calcined at 400°C. for 12 hours, which resulted in a solid having the following empirical formula:

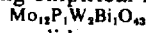
$Mo_{12}P_1W_2Bi_1O_{43}$

The solid was passed through a sieve to yield catalysts particles with mesh sizes in the range of 35 to 100. An empty U-shaped reactor was filled with 4 ml. of the catalyst. The catalyst was used for the oxidation of methacrolein under substantially the same conditions as those employed in Example 1. The following results were obtained:

Conversion of methacrolein: 94.3%
Selectivity to methacrylic acid: 65.8%
Selectivity to acetic acid: 8.4%

EXAMPLE 11

A catalyst was prepared in a manner similar to that of Example 10, except that the quantities of the starting materials were adjusted so as to give a catalyst composition with the empirical formula, $Mo_{12}P_1Mg_1Bi_1O_{41}$. Magnesium nitrate $(Mg(NO_3)_2.6H_2O)$ was used as the source of magnesium. The catalyst was used for oxidization of methacrolein under substantially the same conditions as those employed in Example 1. The following results were obtained:

Conversion of methacrolein: 81.1%
Selectivity to methacrylic acid: 56.3%
Selectivity to acetic acid: 6.6%

EXAMPLES 12 – 22

Catalysts were prepared in a manner similar to that of Example 10, except that the amounts of the starting materials were adjusted so as to give catalyst compositions with the empirical formulas shown in Table II. The catalysts were used for the oxidation of methacrolein under substantially the same conditions as those employed in Example 1. The results are shown in Table II.

TABLE II

| Example No. | Catalyst | Methacrolein conversion (%) | Methacrylic acid selectivity (%) | Acetic acid selectivity (%) |
|---|---|---|---|---|
| 12 | $Mo_{12}P_1W_1Bi_3O_{46.0}$ | 82.9 | 58.3 | 6.9 |
| 13 | $Mo_{12}P_1W_3Bi_1O_{49.0}$ | 80.5 | 68.2 | 7.4 |
| 14 | $Mo_{12}P_3W_1Bi_1O_{48.0}$ | 53.2 | 70.7 | 9.1 |
| 15 | $Mo_{12}P_1W_9Bi_1O_{85.0}$ | 52.1 | 39.2 | 10.8 |
| 16 | $Mo_{12}P_1W_9Bi_1O_{87.0}$ | 48.8 | 42.4 | 7.6 |
| 17 | $Mo_{12}P_5W_1Bi_1O_{53.0}$ | 28.3 | 62.7 | 6.5 |
| 18 | $Mo_{12}P_1W_2Bi_2O_{47.5}$ | 90.8 | 60.5 | 8.3 |
| 19 | $Mo_{12}P_1W_{0.5}Bi_{0.5}O_{40.8}$ | 85.6 | 64.1 | 7.8 |
| 20 | $Mo_{12}P_1Mg_1Bi_3O_{44.0}$ | 78.3 | 52.6 | 10.1 |
| 21 | $Mo_{12}P_1Mg_2Bi_2O_{43.5}$ | 73.7 | 54.1 | 8.2 |
| 22 | $Mo_{12}P_1Mg_{0.5}Bi_{0.5}O_{39.8}$ | 73.8 | 55.3 | 6.7 |

EXAMPLES 23 – 25

The catalysts produced by the procedure of Examples 1, 10 and 11 were used for the oxidation of acrolein instead of methacrolein under substantially the same conditions as those employed in Example 1, except that the reaction temperature was 350°C. The results are shown in Table III.

TABLE III

| Example No. | Catalyst | Acrolein conversion (%) | Acrylic acid selectivity (%) | Acetic acid selectivity (%) |
|---|---|---|---|---|
| 23 | $Mo_{12}P_1W_1V_1O_{44.0}$ | 93.7 | 79.2 | 9.4 |

TABLE III-continued

| Example No. | Catalyst | Acrolein conversion (%) | Acrylic acid selectivity (%) | Acetic acid selectivity (%) |
|---|---|---|---|---|
| 24 | $Mo_{12}P_1W_1Bi_1O_{43.0}$ | 89.8 | 83.3 | 9.7 |
| 25 | $Mo_{12}P_1Mg_1Bi_1O_{41.0}$ | 78.4 | 76.7 | 6.1 |

REFERENCE EXAMPLES 1 – 8

Catalysts missing at least one of their essential components were prepared in a manner similar to that of Example 1, except that the quantities of the starting materials were adjusted so as to give catalysts with the empirical formulas shown in Table IV. The catalysts were used for the oxidation of methacrolein under substantially the same conditions as employed in Example 1. The results are shown in Table IV.

TABLE IV

| Reference Example No. | Catalyst | Methacrolein conversion (%) | Methacrylic acid selectivity (%) | Acetic acid selectivity (%) |
|---|---|---|---|---|
| 1 | $Mo_{12}W_1O_{39.0}$ | 9.0 | 21.1 | 3.5 |
| 2 | $Mo_{12}P_1W_1O_{41.5}$ | 22.8 | 50.4 | 8.7 |
| 3 | $Mo_{12}W_1V_1O_{41.5}$ | 15.4 | 30.2 | 4.5 |
| 4 | $Mo_{12}P_1V_1O_{41.0}$ | 12.5 | 62.1 | 8.2 |
| 5 | $Mo_{12}W_1Bi_1O_{40.5}$ | 13.8 | 32.1 | 7.9 |
| 6 | $Mo_{12}P_1Bi_1O_{40.0}$ | 39.1 | 35.6 | 8.3 |
| 7 | $Mo_{12}P_1Mg_1O_{39.5}$ | 10.3 | 20.1 | 1.8 |
| 8 | $Mo_{12}Mg_1Bi_1O_{38.5}$ | 25.8 | 13.7 | 5.2 |

Having now fully described the invention, it will be apparent to one of ordinary skill in the art that many changes and modifications can be made thereto without departing from the spirit or scope of the invention as set forth herein. Accordingly,

What is claimed as new and intended to be covered by Letters Patent is:

1. The process for preparing acrylic acid or methacrylic acid which comprises reacting acrolein or methacrolein with molecular oxygen in the vapor phase at a temperature from 250° to 450°C, in the presence of a catalyst having the empirical formula: $Mo_{12}$—$P\alpha$ —$X\beta$ —$Y\gamma$ —$O\delta$ wherein X is at least one element selected from the group consisting of tungsten and magnesium; Y is at least one element selected from the group consisting of vanadium and bismuth; $\alpha$ is a number from 0.1 to 5; $\beta$ is a number 0.1 to 10; $\gamma$ is a number from 0.1 to 10, and $\delta$ is a number from 37 to 131.

2. The process of claim 1, wherein said catalysts are prepared by concentrating a solution or a suspension containing the desired components, drying the resulting concentrate, calcining the dried product at a temperature of from 250° to 450°C., for 1 to 48 hours in air, and grinding said dried product into a mesh size ranging from 5 to 100.

3. The process of claim 2, wherein the source of said molybdenum component is ammonium paramolybdate.

4. The process of claim 2, wherein the molybdenum and phosphorus components are in the form of phosphomolybdic acid.

5. The process of claim 2, wherein the molybdenum and phosphorus components are in the form of phosphomolybdates.

6. The process of claim 1, wherein $\alpha$ is 0.2 – 3, $\beta$ is 0.3 – 5, and $\gamma$ is 0.3 – 5.

7. The process of claim 1, wherein the catalyst is supported on a carrier selected from the group consisting of silica, silica containing materials, silicon carbide, and alumina, the amount of carrier ranging from 30 – 97% by weight based on the total weight of carrier and catalyst.

8. The process of claim 1, wherein steam is added to the gaseous reactant mixture in a concentration within the range of from 2 – 80% based on the volume of the feed.

9. The process of claim 1, wherein methacrylic acid is produced from methacrolein.

10. The process of claim 9, wherein the conversion and selectivity of methacrolein to methacrylic acid range from 60 – 70% and 75 – 83% respectively.

11. The process of claim 9, wherein the catalyst has the following empirical formula
$Mo_{12}P_1W_1V_1O_{44.0}$.

12. The process of claim 9, wherein the catalyst has the following empirical formula
$Mo_{12}P_1W_2Bi_1O_{43}$.

13. The process of claim 9, wherein the catalyst has the following empirical formula
$Mo_{12}P_1Mg_1Bi_1O_{41}$.

14. The process of claim 1, wherein X is tungsten and Y is vanadium.

15. The process of claim 1, wherein X is magnesium and Y is bismuth.

16. The process of claim 1, wherein steam and a gas selected from the group consisting of nitrogen, methane, propane, butane, and inert gases are added to the gaseous reactant mixture.

* * * * *